United States Patent [19]

Matsumoto et al.

[11] Patent Number: 5,513,796
[45] Date of Patent: May 7, 1996

[54] DUAL CONTROL DEVICE OF AN AIR CONDITIONER

[75] Inventors: Satoshi Matsumoto; Hikaru Katsuki; Masayuki Shimizu, all of Gunma, Japan

[73] Assignee: Sanyo Electric Co., Ltd., Osaka, Japan

[21] Appl. No.: 425,138

[22] Filed: Apr. 19, 1995

[30] Foreign Application Priority Data

Jun. 15, 1994 [JP] Japan ..................... 3-133117

[51] Int. Cl.$^6$ ............................... G05D 23/00
[52] U.S. Cl. ................... 236/51; 165/22; 62/163
[58] Field of Search ............ 236/51, 46 F, 46 R, 236/DIG. 14; 62/163, 231; 165/22, 25

[56] References Cited

U.S. PATENT DOCUMENTS

| | | | |
|---|---|---|---|
| 4,132,355 | 1/1979 | Cleary et al. ........................ | 236/51 |
| 5,279,458 | 1/1994 | Dewolf et al. ...................... | 165/22 |

Primary Examiner—John M. Sollecito
Attorney, Agent, or Firm—Darby & Darby

[57] ABSTRACT

A control device of an air conditioner comprises a first controller which is installed in a room to be air-conditioned and which generates the signals for controlling an air conditioner. A second controller, which is installed in a different room from the room to be air-conditioned also generates signals for controlling the air conditioner. A main controller which receives the signals from the first controller via a first interface and receives the signals from the second controller via second interface, controls the air conditioner in accordance with the two types of signals. The first controller is designed such that once the signal for starting the air conditioning operation of the air conditioner has been sent to the first interface, the first controller sends the signal for running the air conditioner in a predetermined cycle to the first interface until the first controller transmits to the first interface the signal for stopping the operation of the air conditioner. The main controller is designed to invalidate the signal for running the air conditioner, which is received through the first interface, once it has received the signal for stopping the air conditioning operation of the air conditioner from the second controller through the second interface.

7 Claims, 3 Drawing Sheets

DUAL CONTROL DEVICE OF AN AIR CONDITIONER

BACKGROUND OF THE INVENTION

1. Field of the Invention

The present invention relates to a control device of an air conditioner and, more particularly, to a control device which is equipped with a terminal through which the signals for performing home automation (remote control) are received and a remote control terminal through which the signals from a remote controller are received so as to control an air conditioner through the two systems.

2. Description of the Related Art

Typical conventional control devices for controlling an air conditioner, include one that is designed to turn ON and OFF an air conditioner by operating the switches on a remote controller (wireless remote controller) or to set a temperature and a timer on the air conditioner. The remote controller transmits control data, which includes an operating signal and the temperature desired by the remote controller, at a predetermined time interval (e.g. every 3 minutes). If the control device on the air conditioner does not receive any signal output due to operation of a switch on the remote controller, then it updates the operating data for the air conditioner according to the control data received periodically from the remote controller, i.e. the previously set data from the remote controller.

There is a model of such a control device which is provided with a home automation (HA) terminal for obtaining the signals for carrying out home automation (remote control) from outside. The use of the HA terminal makes it possible to accomplish tele-control, whereby an air conditioner at home can be controlled away from home through a telephone line, or remote control or, the like can be achieved within a home but remote from the air conditioner. The home automation can be used also for simultaneously turning ON/OFF air conditioners installed in different rooms at a hotel or the like.

There is a problem, however, with the air conditioner control devices equipped with the remote control terminal for receiving the signals from such a remote controller and the HA terminal for receiving the signals from the remote control device. The problem arises from an operating characteristic of the air conditioner control device which permits control of the air conditioner through two systems, one for receiving the wireless signals applied through the remote control terminal and the other for receiving the signals applied through the HA terminal. When the air conditioner, which was started by the signal received from the remote controller, is stopped by the signal received through the HA terminal, the air conditioner is automatically restarted when it should not be, by an operating signal which is periodically transmitted from the remote controller.

SUMMARY OF THE INVENTION

The present invention has been made with a view toward solving the above problem, and it is an object of the present invention to provide a control device of an air conditioner which achieves stable control by giving priority to the signals received through the HA terminal.

A control device of an air conditioner according to the present invention comprises: a first controller which is installed in a room to be air-conditioned and which outputs the signals for controlling the air conditioner; through a first interface a second controller which is installed in a different room from the aforesaid room to be air-conditioned and which outputs the signals for controlling the air conditioner; through a second interface and a main controller which receives the aforesaid signals output by the first controller via the first interface and receives the aforesaid signals output by the second controller via the second interface, and which controls the air conditioner in accordance with the aforesaid two types of signals. The signal for starting the operation of the air conditioner is sent to the first interface, the first controller sends the signal for running the air conditioner in a predetermined cycle to the first interface until the first controller outputs the signal for stopping the operation of the air conditioner to the first interface. The main controller then invalidates the signal for running the air conditioner received through the first interface once it has received the signal for stopping the operation of the air conditioner from the second controller through the second interface.

Such a structure gives precedence to the signal received from the second controller through the second interface over the signal received periodically from the first controller through the first interface. This prevents the air conditioner from being inappropriately started by the signal received periodically from the first controller.

DETAILED DESCRIPTION OF THE PREFERRED EMBODIMENT

An embodiment of the present invention will be described in detail in conjunction with the accompanying drawings.

Figure 1:
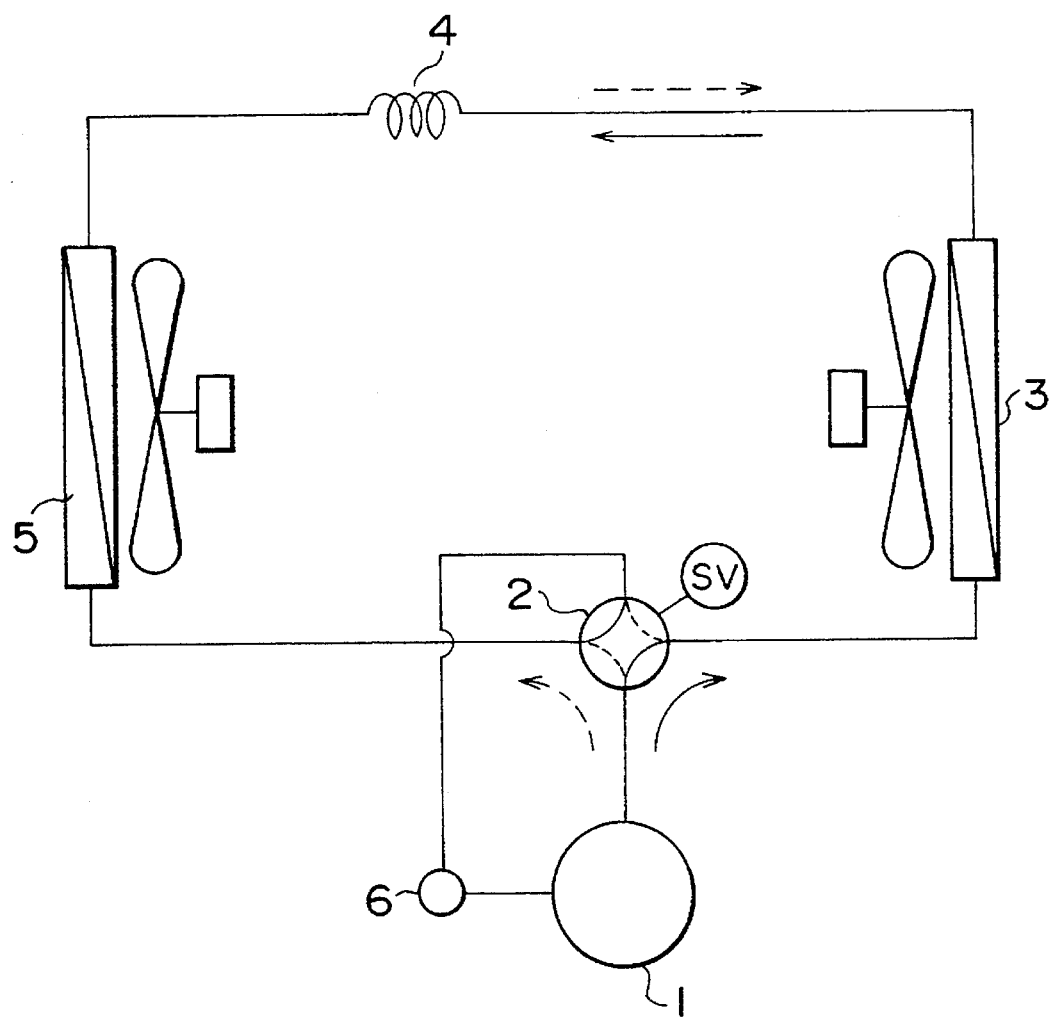
FIG. 1 is a schematic diagram illustrative of an air conditioner which employs the control device according to the present invention.

FIG. 1 is a schematic diagram showing an air conditioner which is controlled by a control device according to an embodiment of the present invention and which is constituted by an indoor unit and an outdoor unit. A refrigerating cycle in the drawing includes a compressor 1, a four-way valve 2, an outdoor heat exchanger 3, a capillary tube 4, an indoor heat exchanger 5 for an indoor installation, and an accumulator 6, which are all connected annularly with a refrigerant pipe in the order they are listed. The outdoor heat exchanger 3 and the indoor heat exchanger 5 are both equipped with blowers to expedite the heat exchange by the outdoor heat exchanger 3 and the indoor heat exchanger 5.

According to the air conditioner described above, when the four-way valve 2 is in a state indicated by the solid line in the drawing, the hot high-pressure refrigerant, which is discharged from the compressor 1, flows in the direction shown by the solid line arrow into the outdoor heat exchanger 3 where the hot high-pressure refrigerant is condensed. The condensed refrigerant is then reduced in pressure through the capillary tube 4 before it evaporates in the indoor heat exchanger 5. The endothermic action at the time of the evaporation of the refrigerant cools the indoor.

On the other hand, when the four-way valve 2 is in a state indicated by the dashed line (cooling mode) in the drawing, the refrigerant, which is discharged from the compressor 1, flows in the direction shown by the dashed arrow into the indoor heat exchanger 5 where the refrigerant is condensed. The refrigerant evaporates in the outdoor area heat exchanger 3, and the indoor is heated by the heat radiating action which takes place when the refrigerant is condensed.

Figure 2:
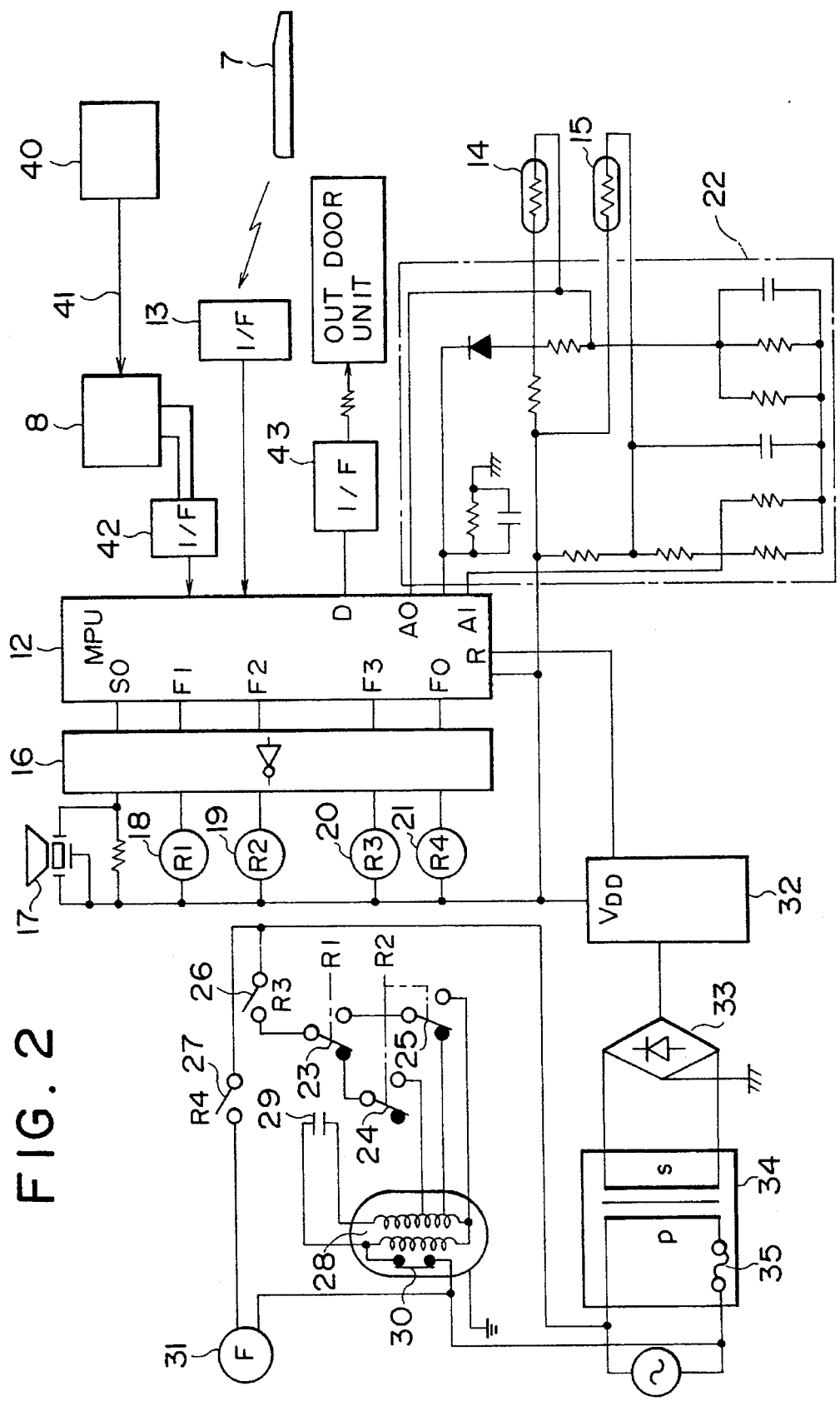
FIG. 2 is a block diagram illustrative of an embodiment of the control device of an air conditioner according to the present invention.

FIG. 2 shows the essential part (indoor unit) of the control device for controlling the air conditioner shown in FIG. 1.

Reference numeral 7 denotes a wireless remote controller which serves as the first controller and which employs infrared rays as the transmitting means. The remote controller 7 is equipped primarily with a switch which is pressed to transmit the signal for switching between ON and OFF of the air conditioner, a switch for transmitting a signal for switching among several modes including heating mode H for heating operation, automatic cooling/heating switching mode C/H wherein the cooling operation and the heating operation are automatically switched according to the room temperature, a switch for transmitting a signal for switching to fan mode F for mere fanning, a switch which is pressed to transmit a signal for setting a desired room temperature and a display (e.g. LCD display) for displaying the operating condition of the air conditioner which has been set by the remote controller. Pushbutton switches, gray code switches, etc. are used for the switches for the above purposes.

Once the setting for the operation of the air conditioner has been completed through the aforesaid switches, the remote controller 7 automatically transmits at regular time intervals (2- to 3-minute intervals) such signals as a signal indicating that the air conditioner is ON, a signal indicating the set temperature, a signal indicating a detected temperature around the remote controller 7 (room temperature), and a signal indicating the operating mode.

Reference numeral 12 denotes a microprocessor which may, for example, be a model TMS2600 made by TI (Texas Instruments). The microprocessor 12 executes programs, which are stored beforehand, in accordance with a signal received from the remote controller 7 via an interface circuit 13 (remote controller terminal); it carries out, for example, a program for starting the operation of the air conditioner or a program for turning ON or OFF the compressor according to the room temperature and the set temperature in response to the signal received from the remote controller 7. If the microprocessor 12 becomes unable to receive the signal from the remote controller 7 for a predetermined time during operation (a time which is approximately three times the aforesaid regular time interval) then it begins a control process based on the room temperature detected through a room temperature detector connected by wire to the microprocessor 12.

The interface circuit 13 has a circuit for receiving and demodulating the signals from the remote controller 7; it supplies the demodulated signals to the microprocessor 12.

Reference numeral 8 denotes the HA (home automation) terminal which is connected, as the second controller, to a remote control device 40 through a signal line 41; it receives a signal for starting the operation of the air conditioner or a signal for stopping the operation of the air conditioner from the remote control device 40. The signals applied to the HA terminal 8 are captured by the microprocessor 12 through the interface circuit 42.

The microprocessor 12 sends control signals such as a signal for actuating the compressor 1 and a signal for switching the four-way valve 2 to the outdoor unit through the interface circuit 43.

Reference numeral 14 indicates a temperature detector composed of a thermistor, the internal resistance thereof changes with a detected temperature; it is installed in a position where it is allowed to detect the temperature of the indoor heat exchanger 5. One end of the temperature detector 14 is subjected to voltage division through a resistor before it is connected to input pod A0 (analog input terminal) of the microprocessor 12; the other end is connected to a DC voltage output terminal VDD of a constant-voltage power supply 32.

Reference numeral 15 indicates another temperature detector composed of a thermistor, the internal resistance thereof changes with a detected temperature just as in the temperature detector 14 also composed of a thermistor. The temperature detector 15 is installed in a position where it is allowed to detect the temperature in an air-conditioned room. One end of the temperature detector 15 is subjected to voltage division through a resistor before it is connected to input port A1 (analog input terminal) of the microprocessor 12; the other end is connected to the DC voltage output terminal VDD of the constant-voltage power supply 32.

The microprocessor 12 carries out analog-to-digital conversion on the voltage which is applied to the input ports A0 and A1 and which changes with the detected temperature, then stores it. At this time, the microprocessor 12 receives several signal values, determines the mean value of the received signal values, stores the mean value as temperature t of the air-conditioned room, and carries out temperature control based on the stored temperature value.

Reference numeral 33 indicates a diode bridge for full-wave rectification; it rectifies the AC power supplied through a current fuse 35 and a step-down transformer 34. The constant-voltage power supply 32 smoothes and stabilizes the power, which has been subjected to the full-wave rectification, before it supplies the power.

Reference numeral 16 denotes a buffer circuit which supplies electric currents to relays 18 to 21 in response to an output from the microprocessor 12; it also drives a sound producing body (speaker) 17. The speaker 17 produces sound, in response to an output from the microprocessor 12, mainly when it receives an effective signal from the remote controller 7, and when the air conditioner has failed.

A relay 18 has a switching armature 23, a relay 19 has switching armatures 24 and 25, and a relay 20 has an armature 26 which is normally open. These relays are energized by signals received from the microprocessor 12 to reverse their connection states (illustrated).

By selecting a proper combination of the open or closed armatures 23 through 26, the number of revolutions of an inductive motor 28, i.e. the amount of air blow of the blower for the indoor heat exchanger 5 shown in FIG. 1, is set at one of the four steps, namely, stop, weak, medium, and strong. Reference numeral 29 denotes a capacitor for its operation. Reference numeral 30 denotes an opening/closing armature which opens to protect the motor from overheating if the motor incurs an abnormal temperature.

Reference numeral 31 indicates a driving motor for changing the angle of an air-flow direction changing plate; it changes the discharging direction of the conditioned air which is supplied into a room by the inductive motor 28. When an armature 27 of the relay 21 closes, the driving motor 31 is energized to change the discharging direction of the conditioned air at regular time intervals.

Figure 3:
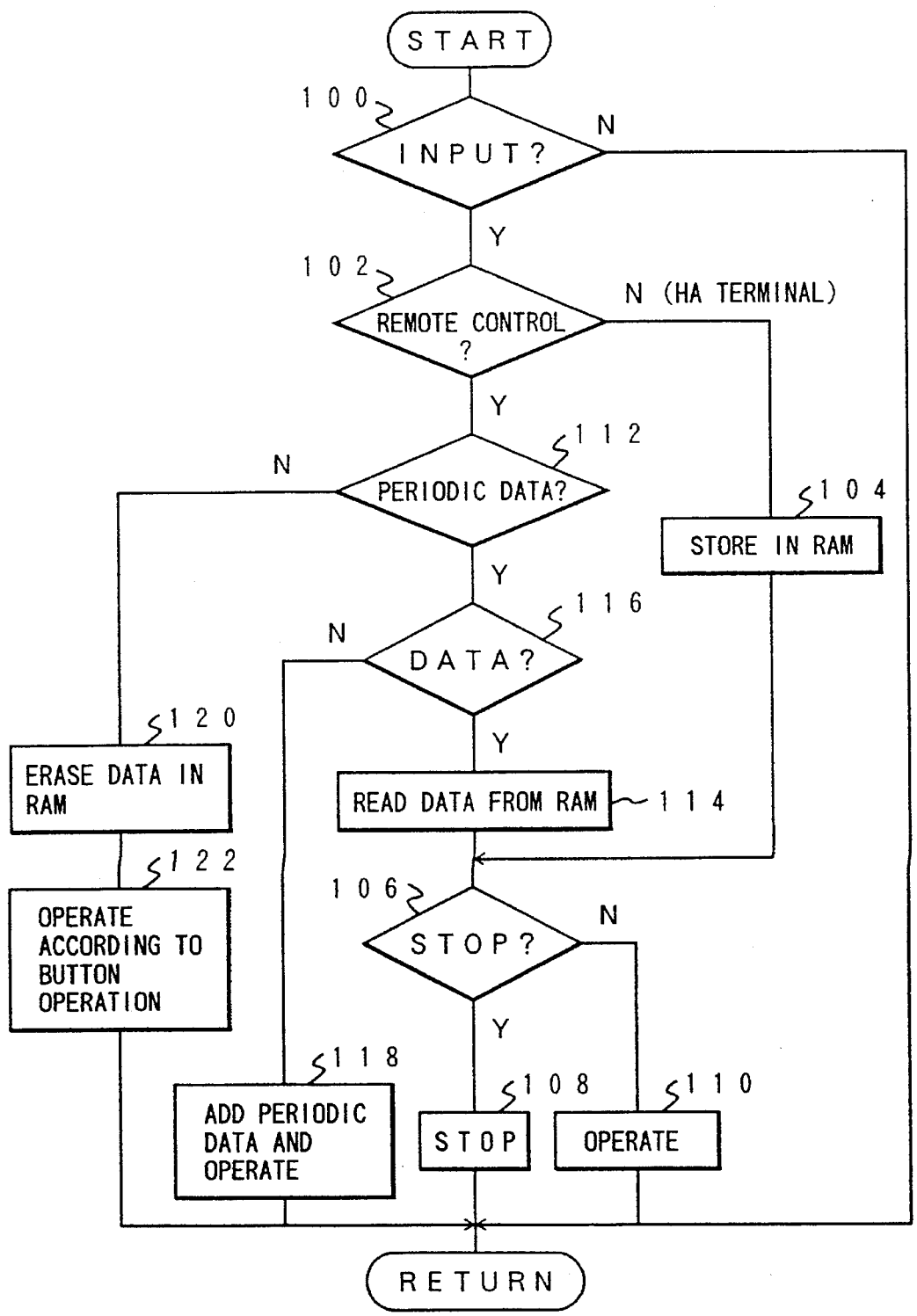
FIG. 3 is a flowchart illustrative of a control routine of the control device of an air conditioner of the embodiment shown in FIG. 2.

The control routine implemented by the microprocessor 12 will now be described with reference to the flowcharts. FIG. 3 shows the control routine according to the embodiment. In step 100, the microprocessor 12 decides whether a control signal has been received or not and if it determines that a control signal has been received, then it further decides in step 102 whether the signal has been received through the remote controller terminal (interface circuit 13) or through the HA terminal 8.

If the signal has been applied to the HA terminal 8, then the microprocessor 12 stores, in step 104, the received signal (ON/OFF of the air conditioner) in a RAM provided with a power backup in the microprocessor 12, then decides in step 106 if the received signal indicates OFF.

If the signal indicates OFF, then the microprocessor 12 stops operating the air conditioner in step 108. If the signal indicates ON, then the microprocessor 12 starts operating the air conditioner in step 110.

In step 102, if the microprocessor 12 determines that the signal has been supplied from the remote controller 7. Then it determines in step 112 if the signal has data (i.e. is the result of the operation of the switches on the remote controller 7 by the user) or is a signal which indicates that it is the periodic signal transmitted from the remote controller 7.

When a signal, which is periodically transmitted from the remote controller 7, is received, the microprocessor 12 decides in step 116 whether data has been stored in the aforesaid RAM which is provided with a power backup. If the data has been stored, then the microprocessor 12 reads the stored data in step 114 and, if it decides that the data indicates OFF in step 106, it ignores the signal from the remote controller 7 and keeps the OFF state of the air conditioner in step 108.

If the data read from the RAM in step 106 indicates ON, then the microprocessor 12 operates the air conditioner in step 110 according to the signal transmitted from the remote controller 7.

If no stored backup data is found in step 116, then the microprocessor 12 runs the air conditioner in step 118 according to the signal transmitted from the remote controller 7.

If the microprocessor 12 finds in step 112 that the data transmitted from the remote controller 7 is the data transmitted through the operations by the user, namely if it is the signal output by manual operation of a switch on the remote controller, then the microprocessor 12 erases, in step 120, the signal, i.e. the data stored in the RAM, so as to clear the home automation control mode. Then the microprocessor 12 carries out in step 122 the control based on the operation of a switch on the remote controller 7, including the setting of temperature, timer, mode, etc. and the start or stop of the operation.

Hence, according to the embodiment, the signal received from the HA terminal is stored and the stored signal is given precedence over the signal which is received at predetermined time intervals from the remote controller and also the signal output by the operation of a switch on the remote controller is given precedence over the aforesaid stored signal in controlling the air conditioner. This prevents an unintended operation from being implemented by the home automation or the remote controller.

Thus, according to the present invention, the signal received through the HA terminal (the second interface) is given a priority to the signal received periodically from the remote controller (the first controller); therefore, unintended operation of the air conditioner by the signal received from the remote controller at predetermined time intervals can be effectively prevented.

What is claimed is:

1. A control device of an air conditioner having a first controller installed in a room to be air-conditioned for generating control signals for said air conditioner, a second controller installed in a different room from said room to be air conditioned, and main controller for controlling said air conditioner based on both said control signals from said first controller via a first interface and said control signals from said second controller via a second interface, comprising:

said first controller including
   a switch for causing said first controller to generate a first signal, which first signal is at least one of said control signals output from said first controller, said first signal causing said air conditioner to change from non-air-conditioning operation to air-conditioning operation,
   trigger outputting means for generating trigger signals at predetermined intervals after said first controller generates the first signal which is caused by said switch, and
   transmitting means for causing said first controller to generate a second signal, which is at least one of said control signals output from said first controller, said second signal causing said air-conditioning operation to respond to said trigger signals;

said second controller including
   first outputting means for causing said second controller to generate a third signal, which third signal is at least one of said control signals output from said second controller, said third signal causing said air conditioner to change from said non air-conditioning operation to said air-conditioning operation, and
   second outputting means for causing said second controller to generate a fourth signal, which fourth signal is at least one of said control signals output from said second controller, said fourth signal causing said air conditioner to change from said air-conditioning operation to said non-air-conditioning operation; and
   gate means for making possible said first signal caused by said switch and said third signal caused by said first outputting means to be transmitted to said main controller, and inhibiting said second signal caused by said transmitting means from being transmitted to said main controller after said fourth signal output from said second outputting means of said second controller is transmitted to said main controller via said second interface.

2. A control device of an air conditioner according to claim 1, wherein said first controller generates signals directed to the first interface by wireless transmission and the second controller generates signals directed to the second interface by a signal line.

3. A control device of an air conditioner according to claim 2, wherein said first controller generates signals directed to the first interface by infrared rays.

4. A control device of an air conditioner according to claim 3, wherein the first controller is a remote controller and the second controller is a remote control unit for performing home automation.

5. A control device for an air conditioner, comprising:
   a main controller for controlling said air conditioner based on control signals;
   a first controller for generating control signals for said air conditioner including a first switch for causing said first controller to generate at least an ON signal as one of said control signals for causing said air conditioner to change from an off state to air conditioning operation, and an interval device for generating at least the ON signals at predetermined intervals so as to cause said air conditioner to continue responding to said ON signal by continuing said air conditioning operation;

a first interface for connecting said first controller to said main controller;

a second controller for generating other control signals for said air conditioner including first output means for generating an ON signal as one of said other control signals for causing said air conditioner to change from off to air-conditioning operation, and second output means for generating an OFF signal as one of said other control signals for causing said air conditioner to change from air-conditioning operation to an off condition;

a second interface for connecting said second controller to said main controller; and gate means for allowing the signal from said switch of said first controller and the signal from said first output means of said second controller to be transmitted to said main controller, inhibiting the ON signals from said interval device from being transmitted to said main controller after said signal from said second output means of said second controller is transmitted to said main controller.

6. A control device of an air conditioner according to claim 5 wherein the first controller is a remote controller installed in a room to be air conditioned and the second controller is a remote control unit installed in a different room for performing home automation.

7. A method of controlling an air conditioner having a remote controller for generating control signals for said air conditioner, a home automation controller for generating control signals of said air conditioner and a main controller for controlling said air conditioner based on both control signals received from said remote controller and said home automation controller, said remote controller generating data signals in response to the operation of switches on said remote controller and periodic signals that repeat the previously generated data signals at regular intervals, comprising the steps of:

determining if a particular control signal received by said main controller is from said remote controller, if the control signal is not from said remote controller, operating the air conditioner according to the control signal and storing the control signal as a stored signal;

if the control signal is from said remote controller, determining if the control signal from said remote controller is a data signal, if the control signal is a periodic signal from the remote controller, determining if there is a stored signal;

if there is no stored signal, operating the air conditioner according to the periodic signal;

if there is a stored signal, comparing the received control signal to the stored signal and operating the air conditioner according to the periodic signal only if it agrees with the stored signal; and if the control signal is a data signal, operating the air conditioner according to the control signal and erasing the stored signal.

* * * * *